United States Patent [19]

Andoh et al.

[11] Patent Number: 5,179,715

[45] Date of Patent: Jan. 12, 1993

[54] MULTIPROCESSOR COMPUTER SYSTEM WITH PROCESS EXECUTION ALLOCATED BY PROCESS MANAGERS IN A RING CONFIGURATION

[75] Inventors: Ichiroh Andoh; Tomoyuki Minamiyama; Shigeo Takahashi; Keisuke Yamada; Shiryo Yasui, all of Kanagawa, Japan

[73] Assignee: Toyo Communication Co., Ltd., Samukawa, Japan

[21] Appl. No.: 711,122

[22] Filed: Jun. 5, 1991

Related U.S. Application Data

[63] Continuation of Ser. No. 166,560, Mar. 8, 1988, abandoned.

[30] Foreign Application Priority Data

| Mar. 11, 1987 | [JP] | Japan | 62-55891 |
| Mar. 13, 1987 | [JP] | Japan | 62-58095 |
| Apr. 9, 1987 | [JP] | Japan | 62-87782 |
| May 21, 1987 | [JP] | Japan | 62-124930 |
| Dec. 28, 1987 | [JP] | Japan | 62-333251 |

[51] Int. Cl.$^5$ .......................... G06F 15/16
[52] U.S. Cl. .................. 395/800; 395/200; 395/325; 395/650; 364/DIG. 1; 364/229.3; 364/281.7
[58] Field of Search ... 364/200 MS File, 900 MS File; 395/800, 200, 325, 650

[56] References Cited

U.S. PATENT DOCUMENTS

| 3,964,055 | 6/1976 | Carruet et al. | 364/200 |
| 4,195,344 | 3/1980 | Yamazaki | 364/200 |
| 4,354,229 | 10/1982 | Davis et al. | 364/200 |
| 4,468,734 | 8/1984 | Lanier et al. | 364/200 |
| 4,539,655 | 9/1989 | Trussell et al. | 364/900 |
| 4,628,508 | 5/1985 | Sager | 364/200 |
| 4,646,232 | 2/1987 | Chang et al. | 364/200 |
| 4,769,771 | 9/1988 | Lippmann et al. | 364/200 |
| 4,805,134 | 2/1989 | Calo et al. | 364/900 |

OTHER PUBLICATIONS

*Proceedings of the IEEE*, vol. 64, No. 6, Jun. 1976, Wakerly, "Microcomputer Reliability Improvement Using Triple Modular Redundancy", pp. 889-895.

*Primary Examiner*—Lawrence E. Anderson
*Attorney, Agent, or Firm*—Graham & James

[57] ABSTRACT

In this computer system, a plurality of processing elements (PE), each having at least two channel processors which manage corresponding communication channels separately, are connected in a ring via the channel processors to form a processing element loop (10). Some of the processing elements are designated as process managers ($SM_1$-$SM_n$) which manage the corresponding process frame groups (20) comprising a predetermined number of process frames. At least one other element is designated as a master manager (MM) which manages those process managers. The respective process managers ($SM_1$-$SM_n$) each allocate a predetermined process to any one process frame of the process frame group (20) which that process manager manages in accordance with each requirement from the master manager (MM) to cause that process frame to execute the predetermined process. Thus both of the function and load decentralizing functions as a computer system are satisfied on the basis of the function of the master managers ($SM_1$-$SM_n$) and process manager (MM).

33 Claims, 14 Drawing Sheets

MULTIPROCESSOR COMPUTER SYSTEM WITH PROCESS EXECUTION ALLOCATED BY PROCESS MANAGERS IN A RING CONFIGURATION

This is a continuation of copending application Ser. No. 07/166,560 filed on Mar. 8, 1988 now abandoned.

BACKGROUND OF THE INVENTION

1. Field of the Invention

This invention relates to computer systems and, more particularly, to such systems which control a plurality of computers, connected in a ring, so as to be related to each other to freely perform decentralized function processing or decentralized load processing.

2. Description of the Prior Art

Recently, an attempt is made at speeding up operations by providing a plurality of processor units (hereinafter referred to as "PU") to process one program in a dispersive manner or a plurality of programs in a parallel manner.

A typical conventional process of this type is a decentralized processing system in which a plurality of PUs are connected via a bus or communication channels to establish a multiprocessor system such that the respective PUs cooperate to process information. Such decentralized system in classified into a decentralized function system and a decentralized load system depending on the contents of the processing allocated to the respective PUs.

As shown in FIG. 1, the decentralized function system is composed, for example, of a main processor MPU and a plurality of processors $PU_1$-$PU_n$ connected in a star. Processors $PU_1$-$PU_n$ have corresponding predetermined functions. For example, $PU_1$ contains a program for controlling a printer; $PU_2$, a program for controlling a CRT display; and $PU_n$, a program for controlling a floppy disc device.

In this system, the program desired by the user is loaded on and executed by main processor MPU. In the course of execution, the main processor MPU advances its processing by requiring the respective PUs to process their jobs which they can process using their functions.

As shown in FIG. 2, the decentralized load system is composed of a main processor MPU and a plurality of processors $PU_1$-$PU_n$ controlled by the main processor. A program to be executed by the main processor is divided into n appropriate subprograms which are then allocated to and executed by the n processors PUs. The result of the execution is collected by the main processor to obtain a final result.

However, such conventional decentralized processing system is beforehand constituted so as to correspond to either one of the decentralized function and load systems and cannot satisfy both the systems at the same time.

In the decentralized function system, almost all functions which can be decentralized in advance are only directed to input/output processing by the peripheral devices of the computer system, as mentioned above, so that it is effective in the decentralization, to the respective PUs, of a program which mainly performs such processing (hereinafter referred to as "I/O limit program"). However, it is not almost useful for other decentralized processing.

In the decentralized load system in contrast with the decentralized function system, a program, almost all of which is directed to calculations (hereinafter referred to as the "calculation limit program") may be dispersed and allocated to a plurality of PUs for parallel processing purposes and is effective in improving the processing capacity. However, it cannot almost exhibit a parallel processing function for the I/O limit program.

As just described above, the decentralized processing according to the conventional computer systems cannot satisfy both the function decentralizing function and load decentralizing function and may not effectively utilize the computer system depending on a program to be executed.

A system is put to practical use in which instead of the PUs, separate computers are disposed to exchange required data among them to thereby use these computers efficiently. Usually, in such a computer system, however, the respective computers merely transmit and/or receive among them their results obtained by execution of their own programs. For example, an application in which a part of a program executed by one computer is dispersed or allocated to other computers for processing purposes cannot be planned.

SUMMARY OF THE INVENTION

This invention derives from the contemplation of the above situations. It is an object of this invention to provide a computer system which has a decentralized processing capacity which optionally executes both of function decentralization and load decentralization.

In order to achieve this object, according to this invention, a basic computer system is constructed by a plurality of network processing elements, each including at least two channel processors which manage communication channels separately, and connected in a ring via the channel processors. Several required ones of the processing elements are designated as a process manager and have a predetermined number of allocated process frames which they each manage. Each process frame comprises a group of user programs which function as a logical CPU in memory to execute a particular job. At least one of other processing elements is designated as a master manager which manages the process managers. The respective process managers each allocate an appropriate process to a required one of the process frames which that process manager manages and instructs the required process frame to execute that process, in accordance with a request from the master manager.

Thus, the computer system can optionally allocate both of the function and load decentralizing functions to thereby realize a greatly enhanced function which cannot be achieved by the prior art.

If a larger scale computer system is constructed by replacing two or more of the processing elements of the basic computer system with corresponding such basic computer systems, it will be an ideal computer system in which all the computer systems perform allocated processing as if they were a single computer and cooperate to achieve an enhanced function.

DESCRIPTION OF THE PREFERRED EMBODIMENT

This invention will now be described in more detail with reference to embodiments thereof.

Figure 1:
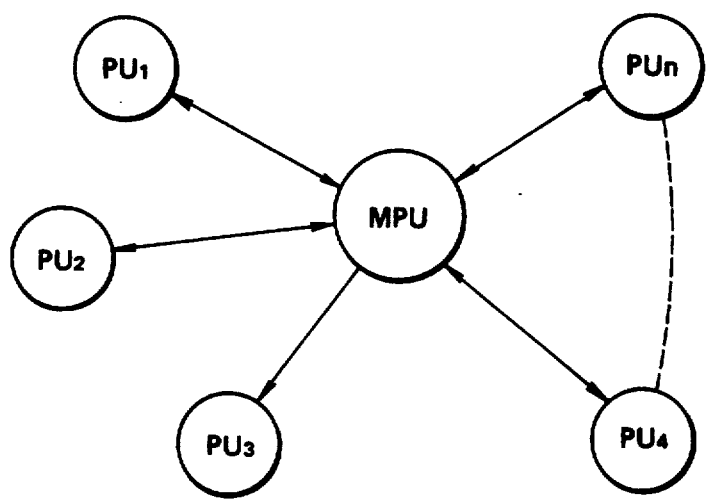
FIG. 1 schematically illustrates the concept of decentralized function processing by a conventional computer system.
Figure 2:
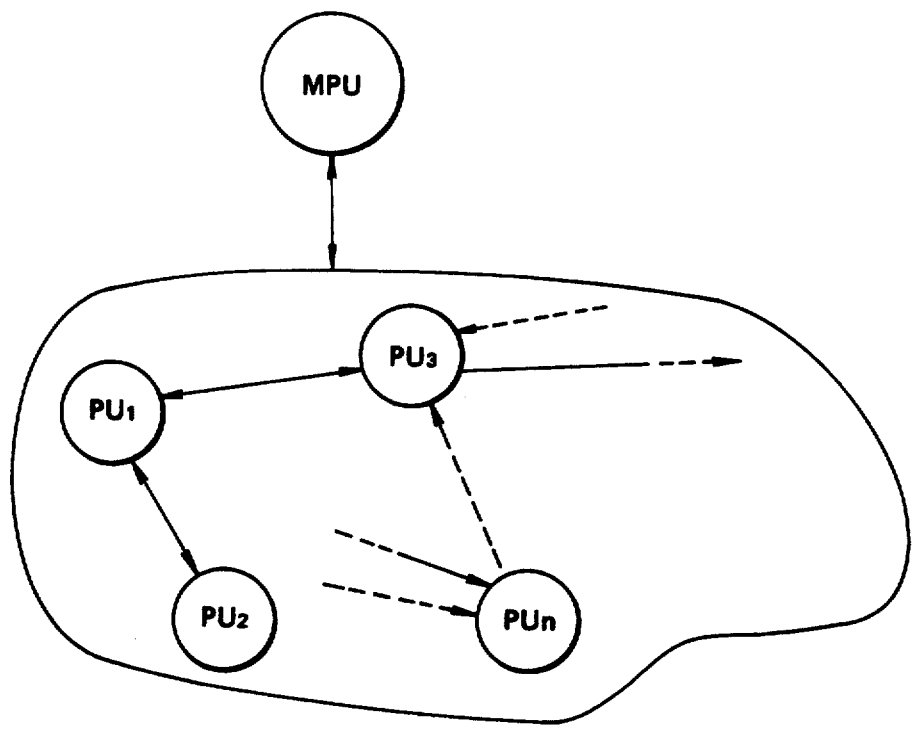
FIG. 2 schematically illustrates the concept of allocated load processing by a conventional computer system.
Figure 3:
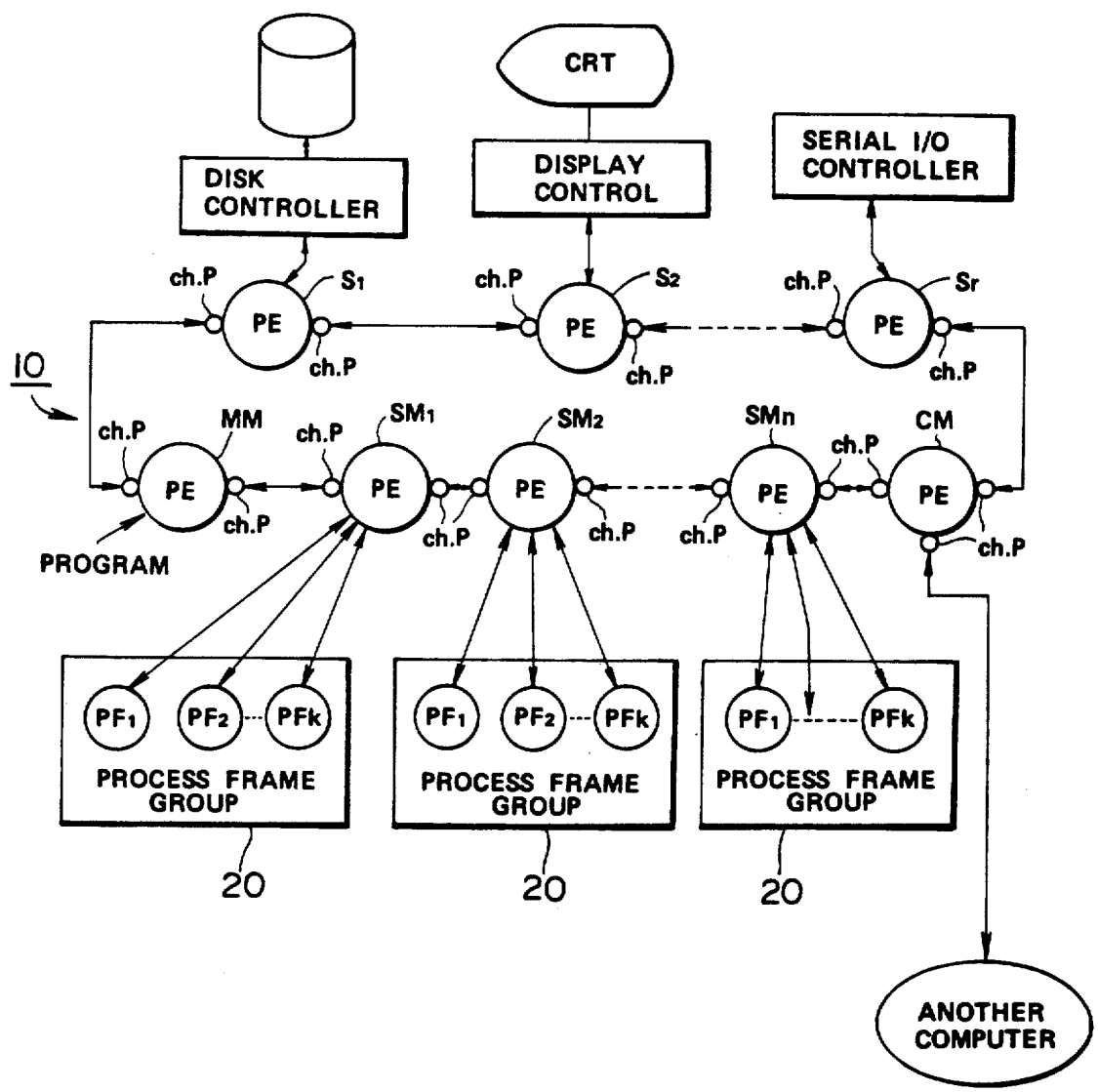
FIG. 3 is a block diagram showing a first embodiment of a computer system according to this invention.

FIG. 3 schematically illustrates the structure of a first embodiment of a computer system according to this invention. According to this embodiment, a plurality of network processing elements (hereinafter referred to as "PE"), each including at least two channel processors ch.P which manage the corresponding communication channel separately, are connected in a ring via the channel processors ch. P to form a PE loop 10. One of the processing elements is designated as a master manager MM which monitors and controls all other PEs; some other PEs as process managers $SM_1$-$SM_n$; some other PEs as servers $S_1$-$S_r$ for driving peripheral devices added to the system; and some other PEs as communication managers CM for communication with other systems. Process managers $SM_1$-$SM_n$ each have a process frame group 20 including a memory in which a place where a process is executed is stored. Each process frame group 20 includes a predetermined number of process frames $PF_1$-$PF_k$ of a group of user programs and functioning as a logical CPU in the corresponding memory area to execute a particular job. Process managers $SM_1$-$SM_n$ each monitor the process contents of the corresponding process frames PF and control the execution of the corresponding processes.

In the arrangement, any process is executed in the following manner. Assume that master manager MM delivers the names of required processes and execution instructions as a message to the corresponding process managers $SM_1$-$SM_n$. In response, the process managers send as a message instructions to read executable programs corresponding to the respective process names to the corresponding servers $S_1$-$S_r$ (in this case, the servers are referred to as "file servers"), and wait for the reception of programs to be executed from the file servers. Thus the received executable programs are allocated by the associated process managers to appropriate process frames PF in the corresponding process frame groups 20 that the process managers themselves manage and executed.

When the process is to be stopped, master manager MM delivers to the respective process managers $SM_1$-$SM_n$ a message comprising the name of the process to be stopped and a stop instruction. The process managers stop the execution of the appropriate processes in accordance with such message.

In this particular arrangement, communications between the processes executed in any process frame group 20 are performed via the associated process manager by delivering to the network a message packet comprising the name of the transmitter process from the transmitter process frame, the name of the designated receiver process and communication contents.

In such inter-process communications, when a process, corresponding to the designated receiver process name in the message packet, is being executed in the process frame group 20 which the corresponding one of process managers $SM_1$-$SM_n$ disposed in the network manage, the corresponding process manager informs the executing process frame of the received contents of the communication.

In response to such process manager's processing, the receiver process frame delivers a message acknowledging the receipt of the message packet to the transmitter process frame via the corresponding appropriate process manager and communications then starts between the associated processes.

When the name of the designated receiver process in the received message packet does not coincide with that of any of the process frames that the associated process manager manages, or when the designated process is not executed, the associated process manager ignores that message packet and delivers same as it is to an adjacent manager. The respective process managers $SM_1$-$SM_n$ sequentially repeat such operation until that message packet reaches the manager which manages the name of the designated receiver process contained in the message packet.

It is to be noted that the main program in the system is loaded via master manager MM. The communication manager CM in the PE loop 10 is used to communicate with other computers or other computer systems in which case the communication manager CM converts a message in the system to which the communication manager belongs to a signal format inherent to those other computers or those other computer systems and transmits and receives the message.

According to such computer system according to this invention, a so-called decentralized load processing can be performed in which parts of a program are allocated to and executed by all the PEs of PE loop 10 connected in a ring. Some PEs, i.e., servers $S_1$-$S_r$, include an I/O interface for peripheral devices, for example, a disc, a CRT, a display or a printer, so that they can drive the peripheral devices without casting a burden upon the main processor (master manager MM). The latter function corresponds to decentralized function processing. All the PEs which compose the system are capable of adjusting to both the function and load centralizations, so that they can optionally allocate parts of a program to be executed to the plurality of PEs for executing purposes irrespective of the nature of the program, namely, whether the program is an I/O limit program or a calculation limit program.

Figure 4:
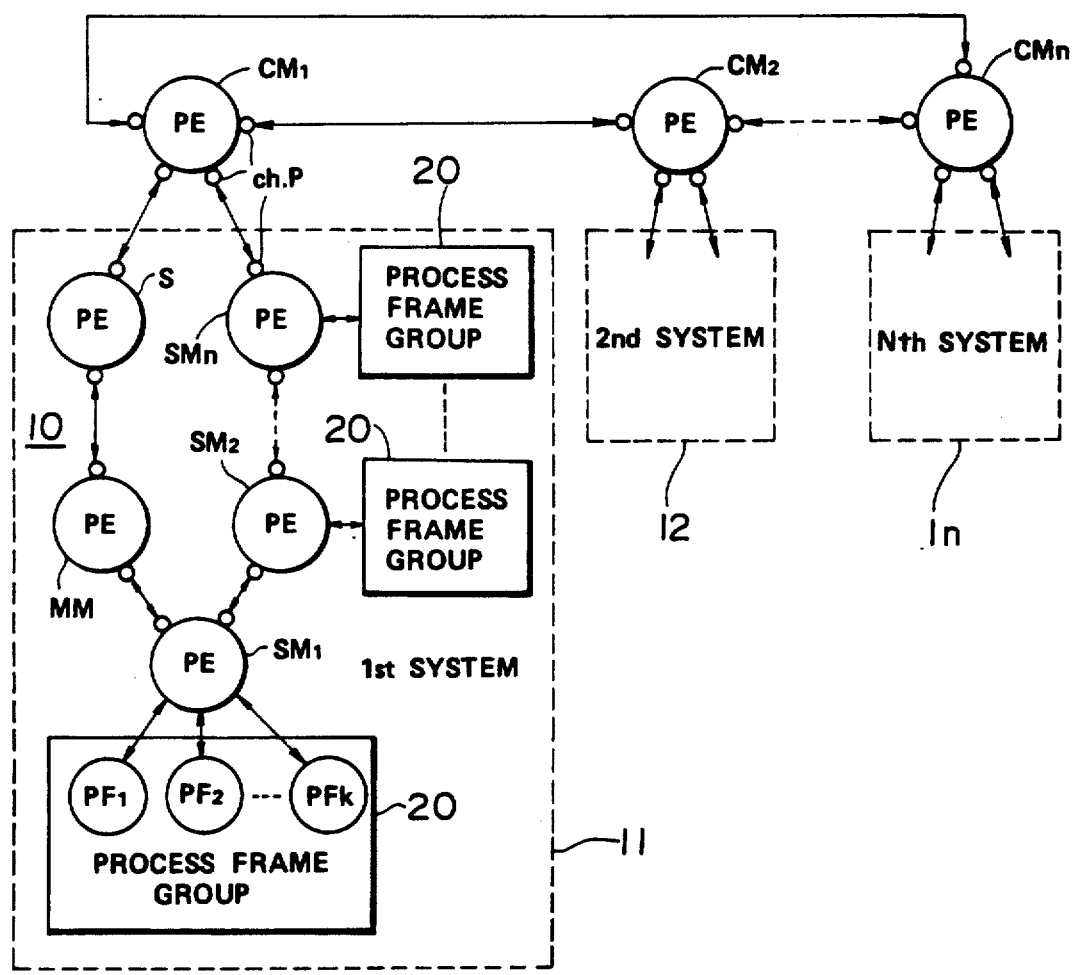
FIG. 4 is a block diagram showing a second embodiment including a modification of the embodiment shown in FIG. 3.

FIG. 4 shows a second embodiment which comprises a modification of the embodiment shown in FIG. 3 and in which the concept of the FIG. 3 embodiment is further expanded. In the second embodiment, a plurality of computer systems, namely, a first system 11, a second system 12, ..., an $n^{th}$ system 1n, each system including a plurality of PEs connected in a ring to form a PE loop 10 and allocated as master manager MM, servers S, process managers SM ($SM_1$-$SM_n$) and communication manager CM, are connected in a ring via the respective communication managers CM ($CM_1$-$CM_n$).

In the second embodiment, the master manager MM of any one of the computer systems, for example first system 11, is designated as a master manager for all the systems 11-1n to cause the designated master manager to control all the other systems. The PE designated as the master manager for all the other systems allocates processing on parts of one program to the respective other systems for decentralized processing.

By such arrangement, even computer systems which are usually dispersed in separate places and separately utilized can be controlled in a unific manner as occasion commands. Furthermore, a desired program is processed in an allocated manner, as mentioned above, to thereby improve the processing speed.

In this respect, if there is no process frame to which a predetermined program (process) can be allocated in the process frame group 20 which is managed by the process manager SM in the associated computer system, other computers are required to execute that predetermined program via that communication manager CM. Thus all or required ones of the ring-like connected computer systems can execute the associated program in an allocated manner.

When all the systems 11-1n are unified into a single larger computer system, which master manager or computer system should be a gross master is determined when initialization is performed for system driving. The position of the master may not be fixed and may be determined for each initialization, if necessary.

Of course, the respective computer systems 11-1n can usually execute their individual programs freely as a single independent computer system separately from the ring.

Expansion of the concept of system of this embodiment will result in the following system structure.

By adding the function of the communication manager CM and master manager MM or equivalent functions to the conventional computer system, and by connecting the computer systems in a ring via communication managers CM, a computer system which satisfies the function-decentralizing and load-allocating functions will be constructed, in the conventional computer systems as in the above embodiment. In this case, a plurality of small-scale computer systems may be united into a larger-scale computer system or larger and smaller computers can be united into a larger large-scale computer system, namely, a computer system which is systematically upgraded optionally may be constructed.

Conventional computer systems connected in the ring are only required to have at least one communication manager CM. Furthermore, when a plurality of computer systems are connected in the ring, the number of communication managers CM may be changed in accordance with the number of computer systems used.

Addition of the master manager to the conventional computer system is for converting a message formation, which is different from those in other computer systems, to a message formation used in the appropriate receiver computer system and not necessarily required if the message format is the same between the transmitter and receiver computer systems.

As in the first and second embodiments, the reason why a plurality of programs can be used in the processing of a process in cooperating relationship to each other as if a single computer system operates is based on the fact that the respective processors have a channel processor ch.P which manages its communication channel independently. Therefore, for conventional processors and/or computer systems which have no such function, one CPU must be used to control all possible communications among them and hence the entire processing capacity is greatly limited.

Figure 5:
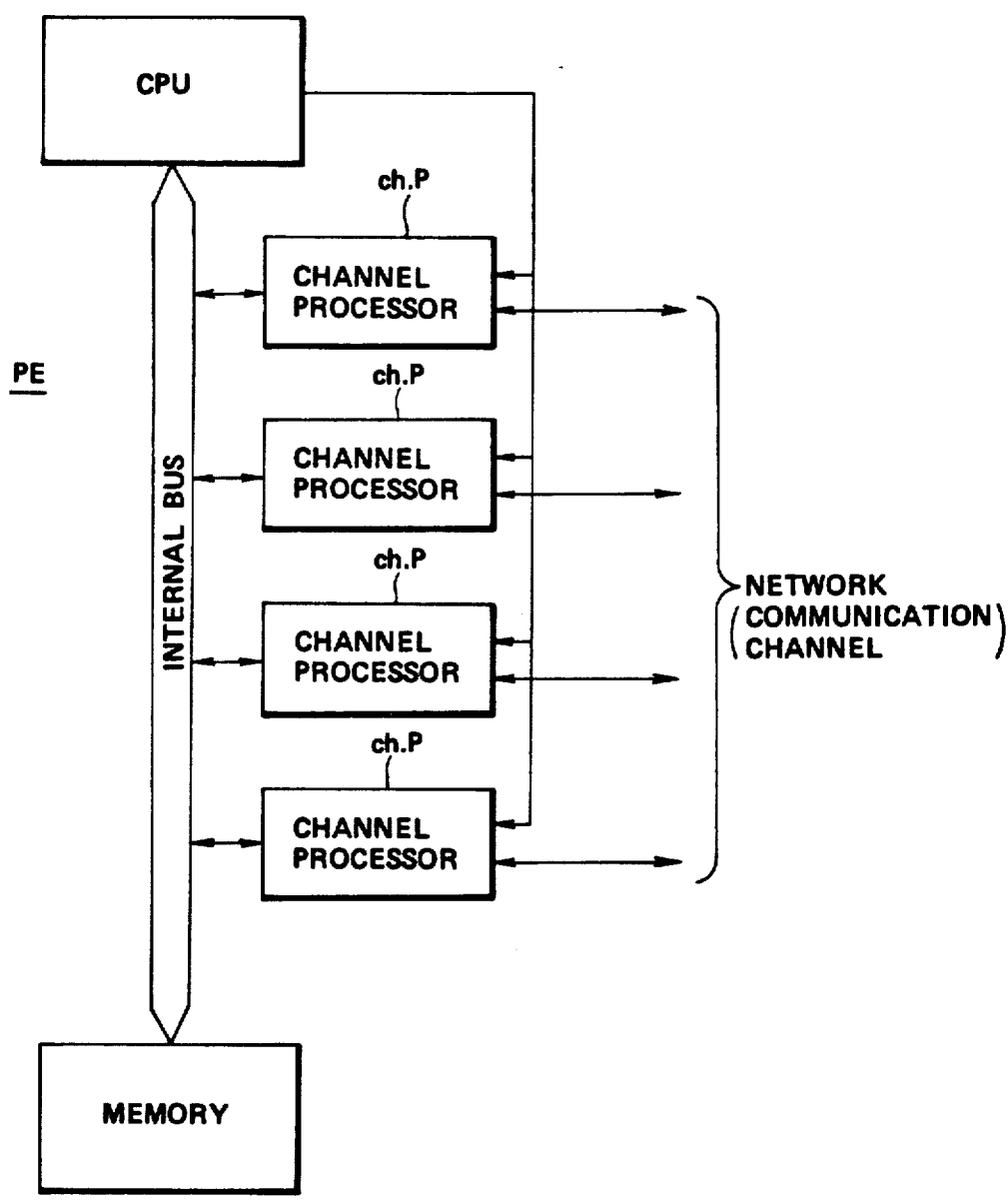
FIG. 5 is a block diagram showing an illustrative structure of a processing element.

FIG. 5 shows an illustrative specific structure of each of the PEs which are used in the first and second embodiments. As shown, the PE comprises a CPU and a plurality of (4, for example) channel processors ch.P. These channel processors ch.P themselves control and manage the corresponding communication channels so as to read a message packet or other messages received via the those communication channels and inform CPU thereof.

The number of channel processors ch.P needed for each PE varies in accordance with the functions allocated to that PE itself. For example, in the case of the respective PEs shown in FIG. 3, each PE requires only two channel processors for connection with adjacent PEs. That of these PEs designated as a communication manager CM has an additional channel processor to communicate with other computers.

While in the first and second embodiments an arrangement in which each PE has a minimum number of channel processors is employed, a pass channel may be formed as a separate route by which, for example, a spare channel processor provided in advance in each PE is connected with the corresponding spare channel processor of any other PE. According to such arrangement, communications may be performed using that route if especial processing is required.

Figure 6:
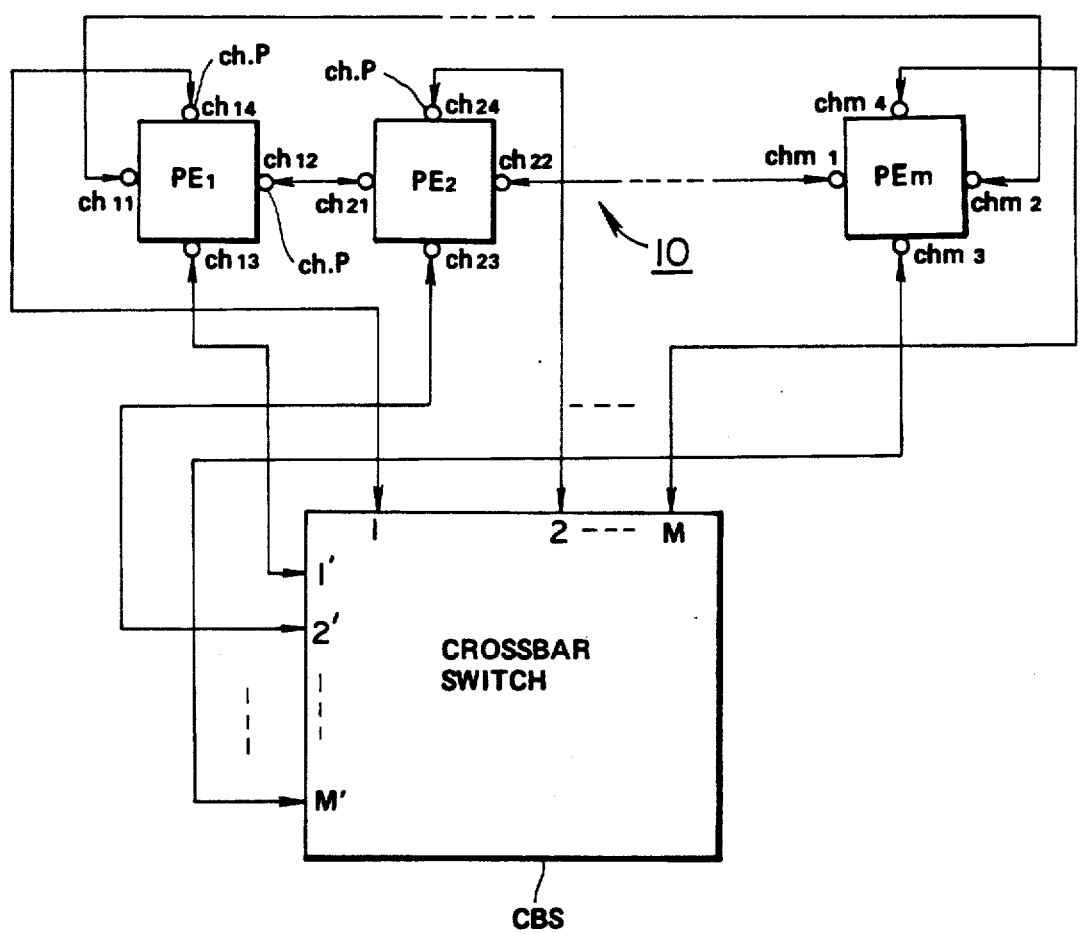
FIG. 6 is a block diagram showing a third embodiment of a computer system according to this invention constructed, for example, by the processing element shown in FIG. 5.

FIG. 6 shows the structure of a third embodiment of a computer system in which such a pass route is formed in PE loop 10. As shown in FIG. 5, for example, two of four channel processors ch.P are used to connect adjacent PEs and the remaining two channel processors ch.P are used to form pass routes with other PEs. It is to be noted that in FIG. 6, only some of the process managers SM of the computer system(s), shown in FIG. 3 or in FIG. 4, which manage the process frames are shown for convenience of explanation (The process frames are also not shown for convenience).

Now in the third embodiment of FIG. 6, $PE_1$-$PE_m$ each comprise a microprocessor which in turn comprises an separate CPU and at least four channel processors ch.P which are managed by the CPU. These PEs each are connected to adjacent PEs via two of the channels processors, for example, a first channel (ch11, ch21, ..., chm1) and a second channel (ch12, ch22, ..., chm2). These PEs and other PEs (not shown) form a ring-like PE loop 10. The remaining two channels, namely, a third channel (ch13, ch23, ..., chm3) and a fourth channel (ch14, ch24, ..., chm4) of these PEs are connected to required terminals of a crossbar switch CBS to form a pass route (a bypass-channel route).

Figure 7:
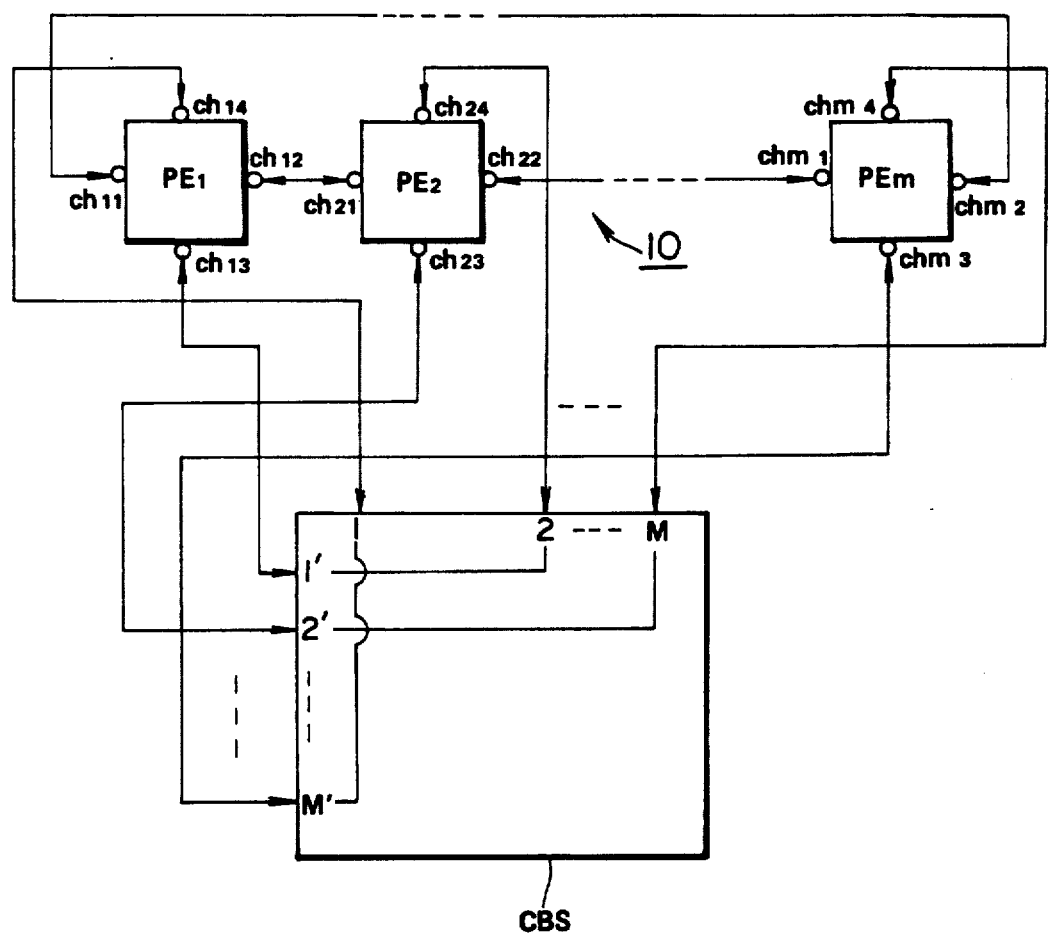
FIG. 7 is a block diagram showing an illustrative connection of a crossbar switch in the embodiment shown in FIG. 6.

In such arrangement, assume that the crossbar switch CBS is connected as shown in FIG. 7. The third channel ch13 of $PE_1$ is connected to a fourth channel ch24 of $PE_2$ via crossbar switch CBS. Similarly, channel ch24 of PE2 is connected to chm4 of $PE_m$; and chm3 of $PE_m$ again to ch14 of $PE_1$. Namely, three $PE_1$, $PE_2$ and $PE_m$ are connected in a ring via crossbar switch CBS.

For these three PEs, the basic channel route (PE loop 10) which is connected to so as to include all other PEs in a ring and the bypass channel routes via crossbar switch CBS are formed in the manner described above, so that the decentralized processing is possible as described hereinafter.

For example, when one program is divided into required blocks via the basic channel route and the respective blocks are allocated to some of the PEs for execution, those of PEs to which decentralized processing is allocated and which require the results of the processing by other PEs or those which require instructions from the master manager MM in the course of the processing are connected in the corresponding bypass channels route via crossbar switch CBS. Thus, when data is transferred among these PEs associated with each other, the bypass channel route are used not via the basic channel route so that independent communications can be performed among these PEs to greatly improve the processing speed of the entire computer system irrespective of the state in which the basis channel route is used. The structure and operation of the crossbar switch CBS are well-known and further description will be omitted.

While in the third embodiment, parts $PE_1$-$PE_m$ alone of PE loop 10 are shown as comprising at least four channel processors forming a pass route (bypass channel route), practical use is not limited to it and various changes and modifications are possible.

For example, an arrangement may be employed in which all the respective ring-like connected PEs includes at least four channel processors and channel processors other than the ring-like connected ones are all connected via the crossbar switch. In that case, only required PEs may selectively be connected via the bypass channel route. If such a pass route can be formed in a fixed manner, corresponding channels may directly be connected without using the crossbar switch.

Of course, by the computer system illustrated as the third embodiment, the larger scale system shown as the second embodiment in FIG. 4 can be constructed.

Figure 8:
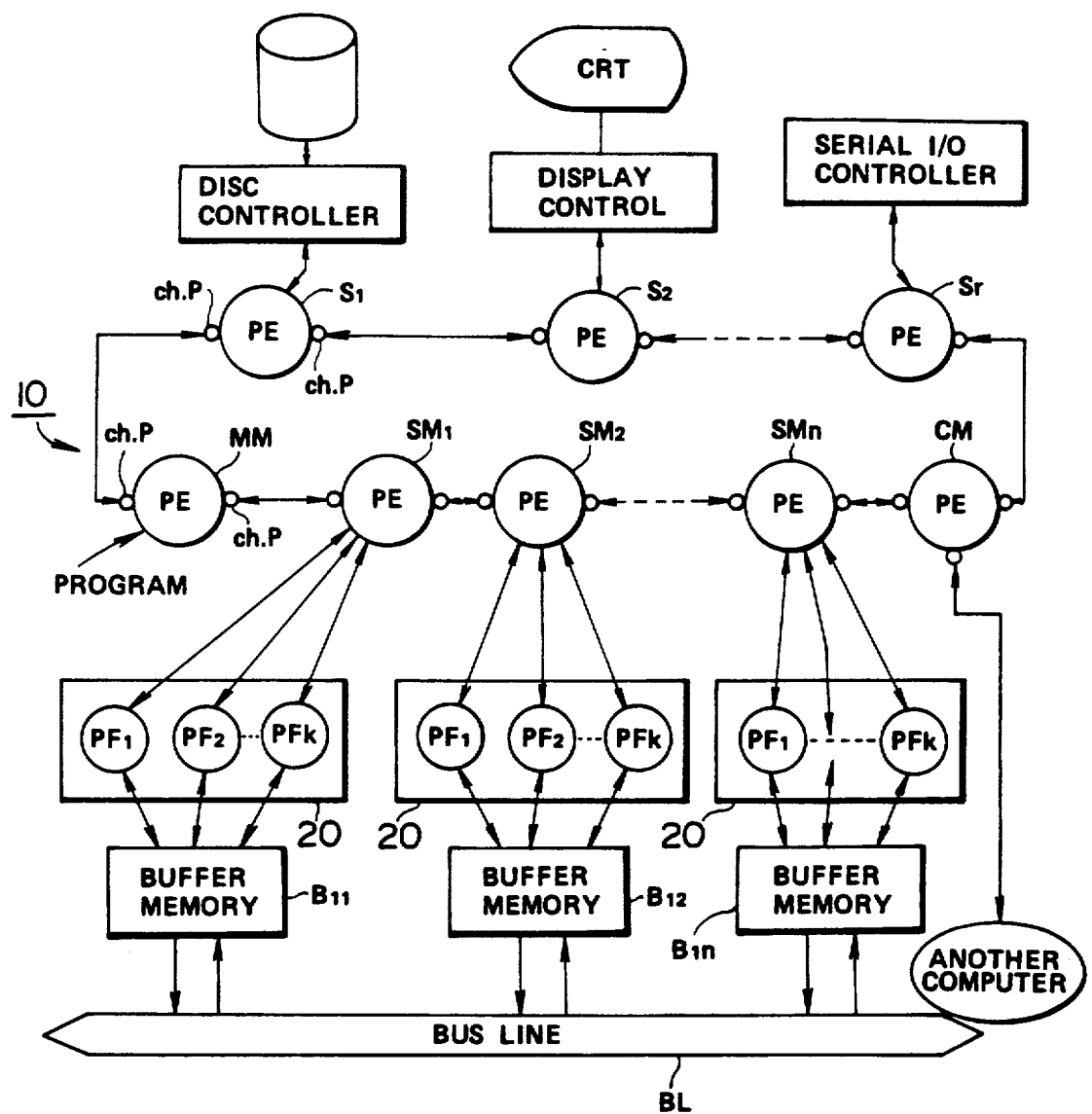
FIG. 8 is a block diagram showing a fourth embodiment of the computer system according to this invention.

FIG. 8 shows a fourth embodiment of the computer system according to this invention. As shown in FIG. 8, the fourth embodiment includes frame groups 20 (see FIG. 3) managed by the respective process managers $SM_1$-$SM_n$ which are connected to a common bus line BL via the corresponding buffer memories $B_{11}$-$B_{1n}$ to thereby perform transfer in a so-called DMA (direct memory access) manner. The embodiment of FIG. 8 is based on the system structure of the first embodiment.

Therefore, according to the fourth embodiment, "communications among processes executed in any process frame group 20" mentioned in the first embodiment can directly be performed using bus line BL via the corresponding buffer memories $B_{11}$-$B_{1n}$ and hence the degree of freedom of the PE loop 10 which comprises ring-like connected channel processors ch.P (master manager MM, process managers $SM_1$-$SM_n$, servers $S_1$-$S_r$ and communication manager CM) is further improved. In the "communications among processes", only when some message is input to in a buffer memory, the corresponding one of the process managers $SM_1$-$SM_n$ which manage the corresponding frame groups 20 is required to transfer the input message to the designated receiver process frame and the load on these process managers $SM_1$-$SM_m$ as a member of the PE loop 10 are greatly alleviated. This implies a great improvement to the processing speed of the entire computer systems.

The respective process frame groups 20 managed by the corresponding process managers $SM_1$-$SM_n$ are connected to the bus line via corresponding buffer memories $B_{11}$-$B_{1n}$ to thereby allow data transmission and/or reception in the "communications among processes" irrespective of the state of the corresponding process managers to thereby shorten as a whole the waiting time for data transfer.

The buffer memories $B_{11}$-$B_{1n}$ used are of FIFO (first-in first-out) type. Even if regular memories having no such structure may be used as buffer memories $B_{11}$-$B_{1n}$ if they are supplied with a FIFO function by memory control means such as a DMA controller which is provided together with these memory.

Of course, the structure of fourth embodiment may be applicable not only to the first embodiment but also to the second or third embodiment.

Figure 9:
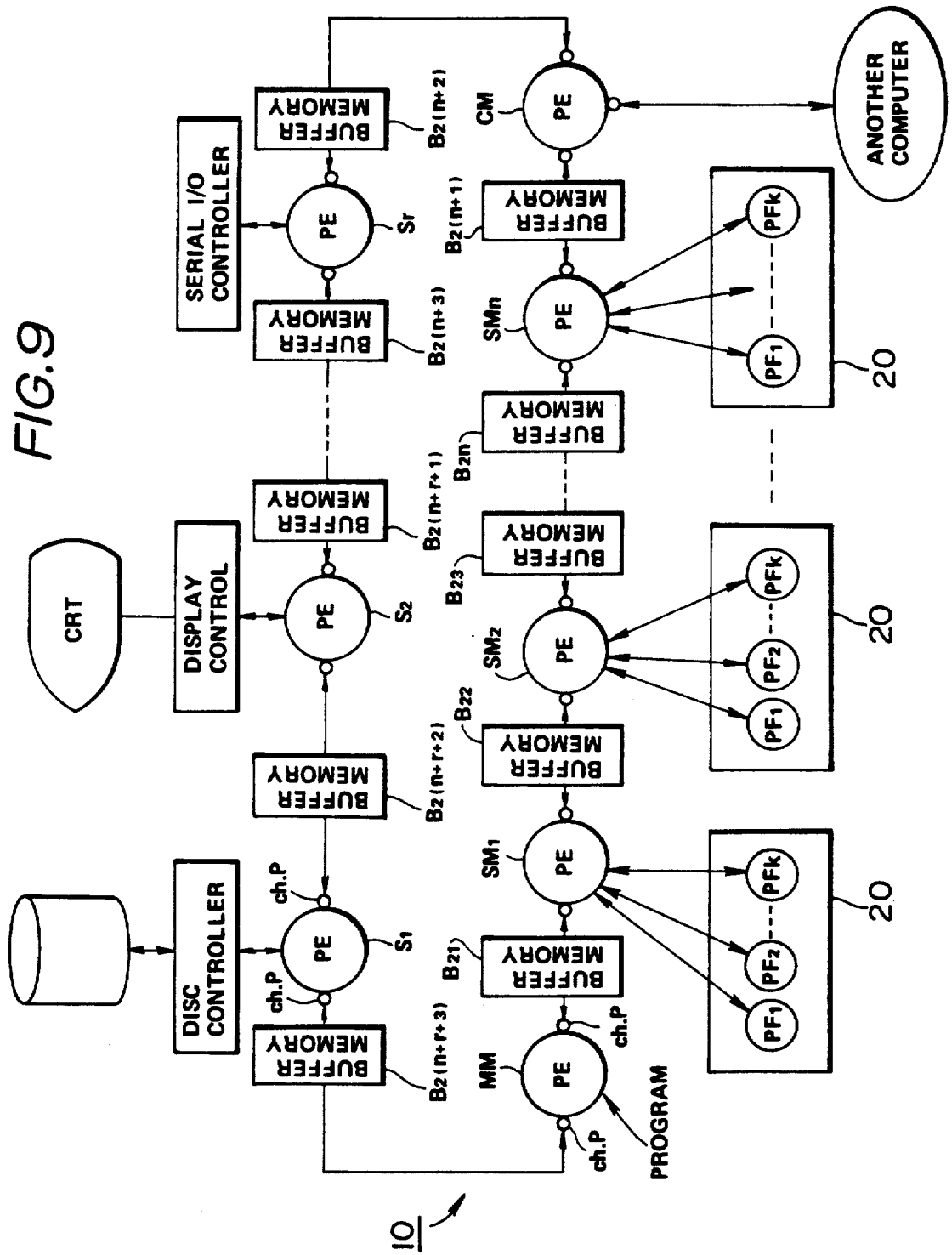
FIG. 9 is a block diagram showing a fifth embodiment including a modification of the first embodiment shown in FIG. 3 or the fourth embodiment shown in FIG. 8.

FIG. 9 schematically illustrates the structure of a fifth embodiment of the computer system according to this invention. As shown in FIG. 9, in the fifth embodiment, buffer memories $B_{21}$-$B_{2(n+r+3)}$ having a FIFO structure are provided, one intervening between any adjacent PEs in the PE loop 10 comprising the mater manager MM, process managers $SM_1$-$SM_n$, communication manager CM and servers $S_1$-$S_r$ such that the message communications which would otherwise be performed among the respective PEs via channel processors ch.P and communications channels are performed further via corresponding ones of buffer memories $B_{21}$-$B_{2(n+r+3)}$.

Figure 10:
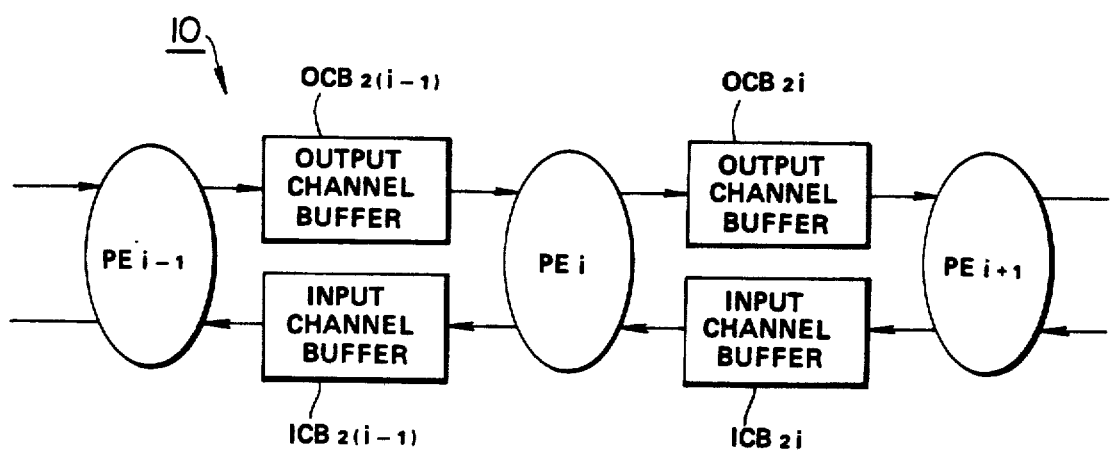
FIG. 10 is a block diagram of the specified essential structure of the fifth embodiment shown in FIG. 9.

The message communications performed via these buffer memories will now be described in more detail. FIG. 10 conceptually illustrates the connection of part of the PEs and buffer memory loop 10 used in the fifth embodiment. As shown in FIG. 10, there are two kinds of communication channels, namely, for outputting and inputting purposes between any adjacent PEs and, correspondingly, there are two types of channel buffers, namely, shown as output and input channel buffers $OCB_{2(i-1)}$, $OCB_{2i}$ and $ICB_{2(i-1)}$, $ICB_{2i}$, respectively.

Figure 11:
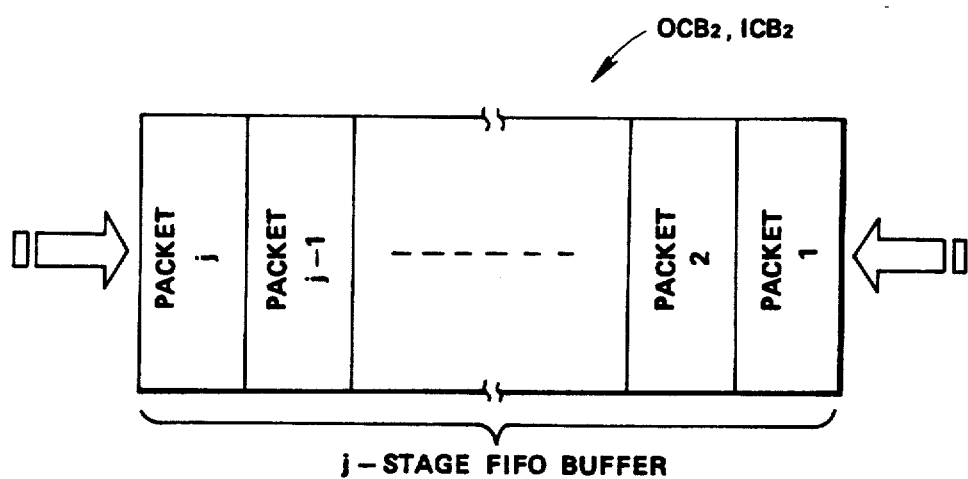
FIG. 11 schematically illustrates the structure of a buffer memory shown in FIG. 10.

FIG. 11 illustrates the structure of those channel buffers. The output and input buffers are the same in structure and take the form of a FIFO, as mentioned above.

These buffer are accessed in units of a packet which is represented in a format which the respective processors can interpret.

Figure 12:
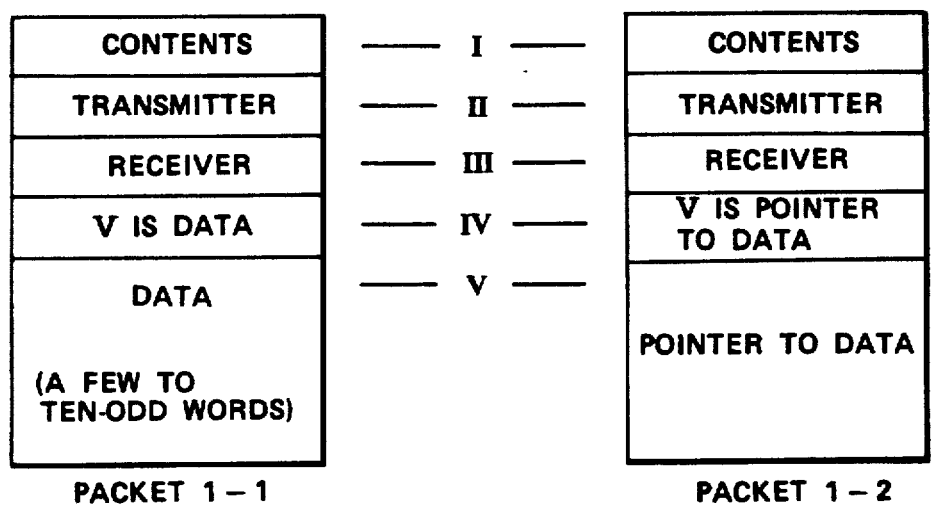
FIG. 12 schematically illustrates the structure of a packet in the fifth embodiment.

FIG. 12 illustrates the structure of a packet which is composed of the following five elements;

i: the content of a message (the content to be processed);

ii: a message transmitter (processing requester);
iii: a message receiver (processing executor);
iv: the type of data which the message receiver receives; and
v: data or a pointer to the data which the message receiver receives.

The element iv determines whether v represents the data itself or a pointer to the data.

In the parallel processing by a regular multiprocessor, many segments of data which one process (unit processing) transmits and/or receives are about a few to ten-odd words. A single packet secures ten-odd words as data in advance. The type of data in iv represents that v is data itself (see packet 1-1 in FIG. 12).

When a quantity of data exceeding the quantity secured by a packet is transmitted/received, the element iv indicates that v is a pointer to the data (packet 1-2) in FIG. 12).

In that case, the actual data is usually stored in an exclusive memory for the message transmitter. The pointer indicates the head address of the transmitter in the exclusive memory in which data exists and the number of data segments.

Here, a specific example of communications will be shown.

Figure 13:
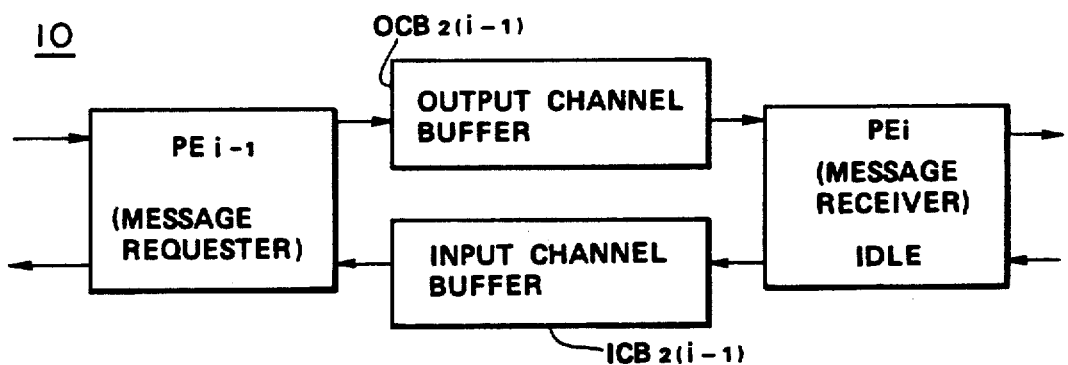
FIGS. 13 and 14 are a simplified block diagram used for explaining the communications among the managers in the fifth embodiment.

(1) A Simple Example:

Situation: a $PE_{i-1}$ requests an adjacent $PE_i$ to execute a process and the requested $PE_i$ is idle. FIG. 13 illustrates such situation.

The behavior of $PE_{i-1}$ and $PE_i$ under such situation will be described below.

$PE_{i-1}$ inputs the following data into the respective elements of a packet as follows:

$$\left\{ \begin{array}{l} \text{i: a message which } PE_{i-1} \text{ transmits to } PE_i; \\ \text{ii: } PE_{i-1}; \\ \text{iii: } PE_i; \\ \text{iv: the type of data; and} \\ \text{v: data (or a pointer to the data),} \end{array} \right.$$

and loads this packet on output channel buffer $OCB_{2(i-1)}$ at which time $PE_{i-1}$ is released from this process and can shift to the execution of the next process.

$PE_i$ periodically reads a message stored in the first package loaded on buffer $OCB_{2(i-1)}$, executes the designated process, and inputs the following data into the respective elements of a packet as follows:

$$\left\{ \begin{array}{l} \text{i: a message which } PE_i \text{ transmits to } PE_{i-1}; \\ \text{ii: } PE_i; \\ \text{iii: } PE_{i-1}; \\ \text{iv: the type of data; and} \\ \text{v: data (a pointer to the data),} \end{array} \right.$$

and loads this packet on the input channel buffer $ICB_{2(i-1)}$.

$PE_{i-1}$ periodically goes to read the first loaded packet on packet $ICB^{2(i-1)}$ and checks to see if the loaded contents correspond to the packet contents which are loaded on the first of the preceding output channel buffer $OCB_{2(i-1)}$. If so, it temporarily reserves the process executed so far, receives the data in the input packet $ICB_{2(i-1)}$, shifts the packets in these buffers $OCB_{2(i-1)}$ and $ICB_{2(i-1)}$ one by one and update same. $PE_{i-1}$ then reopens the execution of the process reserved so far.

(2) A complicated example:

Situation: although a $PE_{i-1}$ requests an adjacent $PE_i$ to execute a process, the $PE_i$ is busy executing another process, so that $PE_i$ requests an adjacent idle $PE_{i+1}$ to execute that process in $PE_i$'s place.

Figure 14:
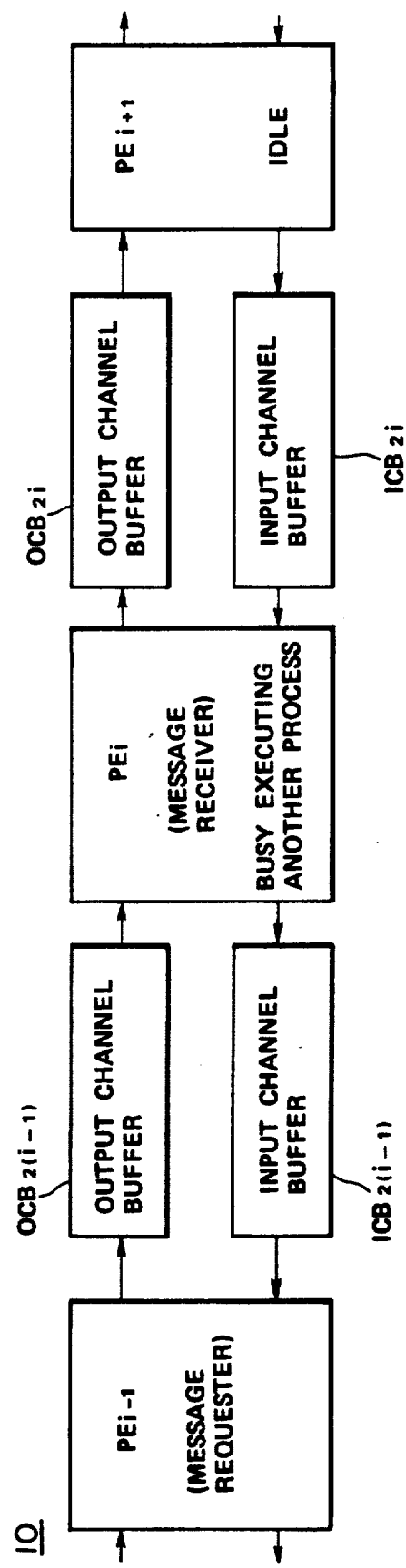

FIG. 14 illustrates such situation under which the behavior of $PE_{i-1}$, $PE_i$ and $PE_{i+1}$ will be shown below. $PE_{i-1}$ inputs the following data to the respective elements of a packet as follows:

$$\left\{ \begin{array}{l} \text{i: a message which } PE_{i-1} \text{ transmits to } PE_i; \\ \text{ii: } PE_{i-1}; \\ \text{iii: } PE_i; \\ \text{iv: the type of data; and} \\ \text{v: data (or a pointer to the data),} \end{array} \right.$$

and loads this packet on the output channel buffer $OCB_{2(i-1)}$ at which time $PE_{i-1}$ is released from this process and shifts to the execution of the next process.

$PE_i$ periodically goes to read the first packet loaded on buffer $OCB_{2(i-1)}$ in which case the process under execution is temporarily reserved. Thus $PE_i$ recognizes that a message for $PE_i$ has arrived, but it is executing another process, so that it requests an adjacent idle $PE_{i+1}$ to execute that process in $PE_i$'s place. Namely, $PE_i$ inputs the following data into the respective elements of a packet as follows:

$$\left\{ \begin{array}{l} \text{i: a message which } PE_{i-1} \text{ transmits to } PE_{i+1}; \\ \text{ii: } PE_{i-1}; \\ \text{iii: } PE_{i+1}; \\ \text{iv: the type of data; and} \\ \text{v: data (or a pointer to the data),} \end{array} \right.$$

and loads this packet on output channel buffer $OCB_{2i}$, transfers the element iii of the packet previously loaded on buffer $OCB_{2(i-1)}$ from $PE_i$ to $PE_{i+1}$, and reopens the process reserved so far.

$PE_{i+1}$ periodically reads a message stored in the first packet loaded on the output channel buffer $OCB_{2i}$ and executes the designated process if it is idle.

$PE_{i+1}$ inputs the following data into the respective elements of a packet as follows:

$$\left\{ \begin{array}{l} \text{i: a message which } PE_{i+1} \text{ transmits to } PE_{i-1}; \\ \text{ii: } PE_{i+1}; \\ \text{iii: } PE_{i-1}; \\ \text{iv: the type of data; and} \\ \text{v: data (or a pointer to the data),} \end{array} \right.$$

and loads this packet on input channel buffer $ICB_{2i}$.

$PE_i$ periodically goes to read the first loaded packet on buffer $ICB_{2i}$ and checks to see if those contents correspond to those of the packet first loaded on the preceding output channel buffer $OCB_{2i}$. If so, $PE_i$ temporarily reserves the process now under execution, receives the data in the packet on buffer $ICB_{2i}$, and returns the iii of the first packet loaded on the preceding output channel buffer $OCB_{2(i-1)}$ from $PE_{i+1}$ to $PE_i$.

Furthermore, it copies the data in the packet on input channel buffer $ICB_{2i}$ and loads that data on input channel butter $CB_{2(i-1)}$, namely, it inputs the following data into the respective elements of a packet as follows:

$$\begin{cases} \text{i: a message which } PE_i \text{ transmits to } PE_{i-1}; \\ \text{ii: } PE_i; \\ \text{iii: } PE_{i-1}; \\ \text{iv: the type of data; and} \\ \text{v: data (or a pointer to the data),} \end{cases}$$

and loads this packet on input channel buffer $ICB_{2(i-1)}$. It then shifts and updates the packets on output and input channel buffers $OCB_{2i}$ and $ICB_{2i}$ one by one, and reopens the execution of the process reserved temporarily.

In the case of a more complicated example, a similar method may be employed to found an idle PE to cause same to execute a requested process.

In the fifth embodiment, the process in which PE refers to the content of a channel buffer is performed in preference to any other processes.

According to the fifth embodiment, the time for which the respective PEs which constitute a part of the PE loop 10 are devoted to message communications is greatly reduced. Even if the processes executed in parallel in these PEs increase in number, they can rationally be performed at high speed to thereby realize a very efficient operating system.

While FIG. 9 shows the structure in which buffer memories $B_{21}-B_{2(n+r+3)}$ each intervene between corresponding adjacent ones of all the PEs which constitute PE loop 10 are illustrated, the position and number of buffer memories are optional, and these respective buffer memories may be specifically disposed restrictively between corresponding adjacent ones of several particular PEs.

The structure of the fifth embodiment may, of course, be equally applicable not only to the first embodiment but also to the second to fourth embodiments.

Figure 15:
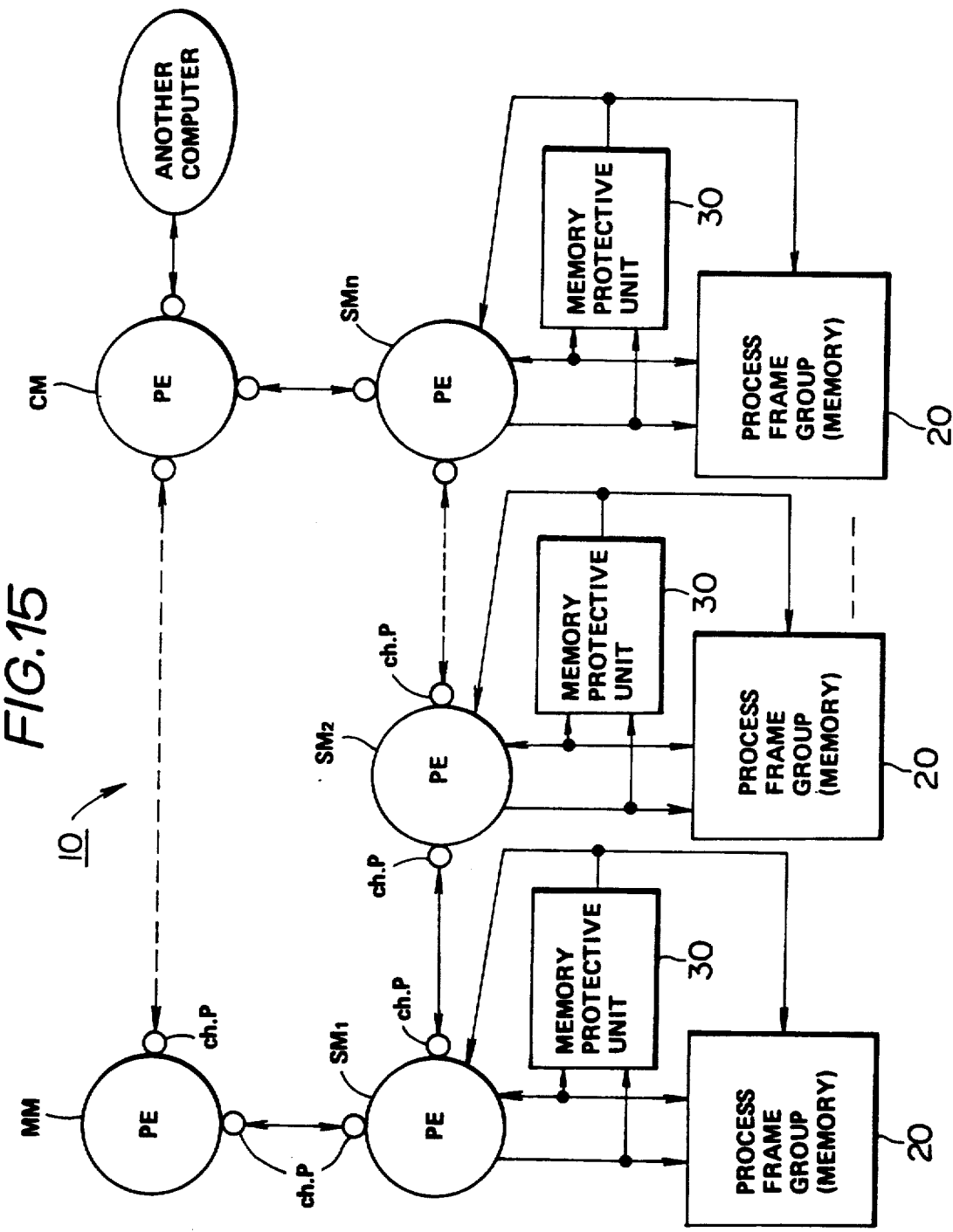
FIG. 15 is a block diagram showing the essential structure of a sixth embodiment of the computer system according to this invention.

FIG. 15 conceptually illustrates the structure of a sixth embodiment of the computer system according to this invention. In the sixth embodiment of FIG. 15, memory protective units 30 each are provided in parallel between the corresponding ones of the PEs constituting PE loop 10 designated as process managers $SM_1-SM_n$ and the corresponding process frame groups 20 managed by the corresponding process managers in order to prevent destruction of the user programs loaded as the process frames PFs ($PF_1-PF_k$) in the corresponding process frame groups 20 by unauthorized access of the process manager to the corresponding process frame group 20.

The sixth embodiment will now be described in more detail with reference to FIG. 16 which shows the illustrative specific structure of any pair of process frame group 20 and memory protective unit 30.

Figure 16:
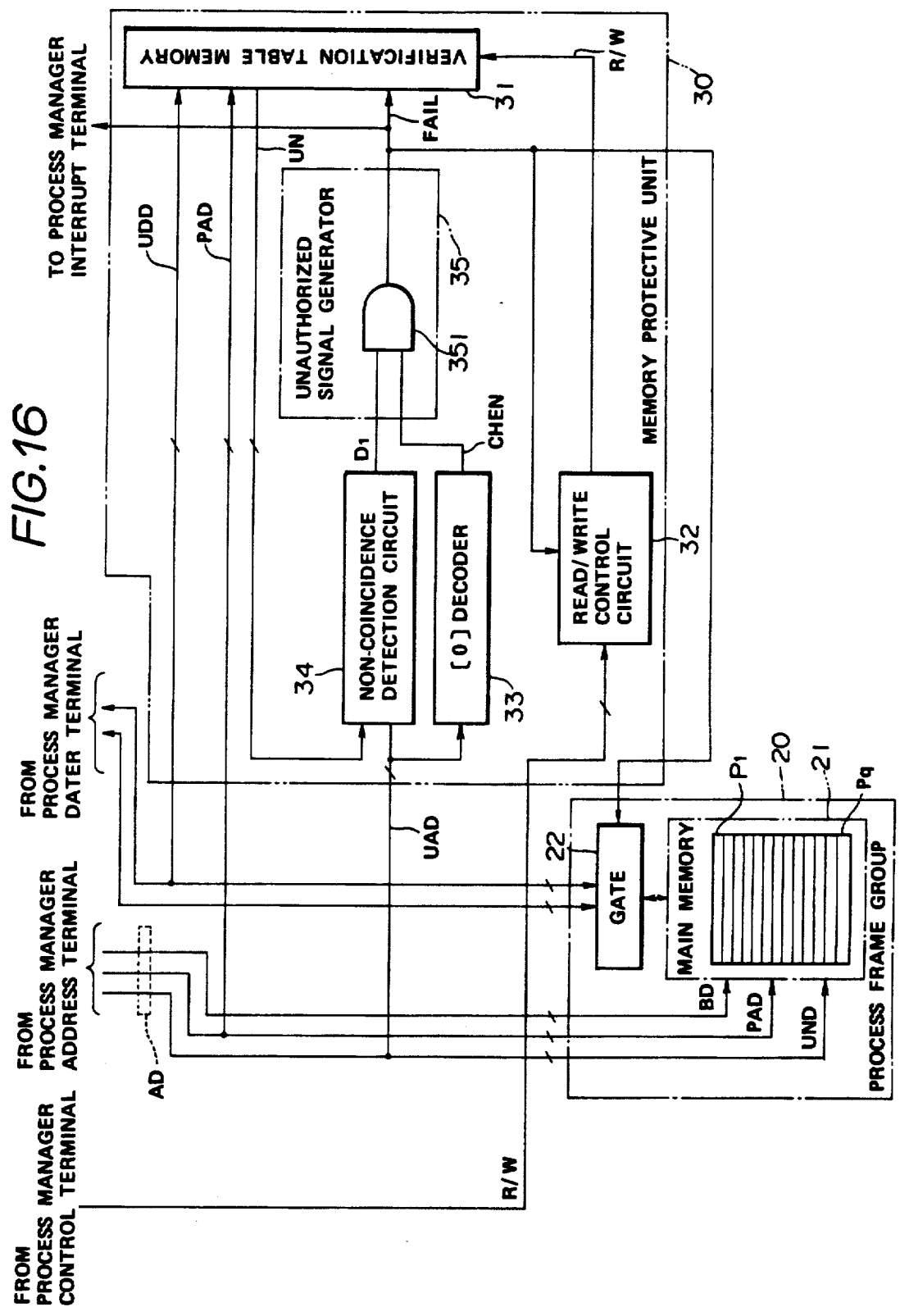
FIG. 16 is a block diagram showing an illustrative specified structure of a memory protective device shown in FIG. 15.

As shown in FIG. 16, process group (memory) includes a main memory 21, the storage area of which is divided into k pages $P_1-P_k$, and a gate 22 which connects the data terminals of main memory 21 with the data terminals of the corresponding process manager PE with one user being determined for each page. The respective process frames PF are registered and stored in the corresponding pages. It is assumed that only the $0^{th}$ process frame (which may be, for example $PF_1$) registered on the first page $P_1$ of pages $P_1-P_k$ is a freely accessible frame for which no particular user is determined.

Figure 17:
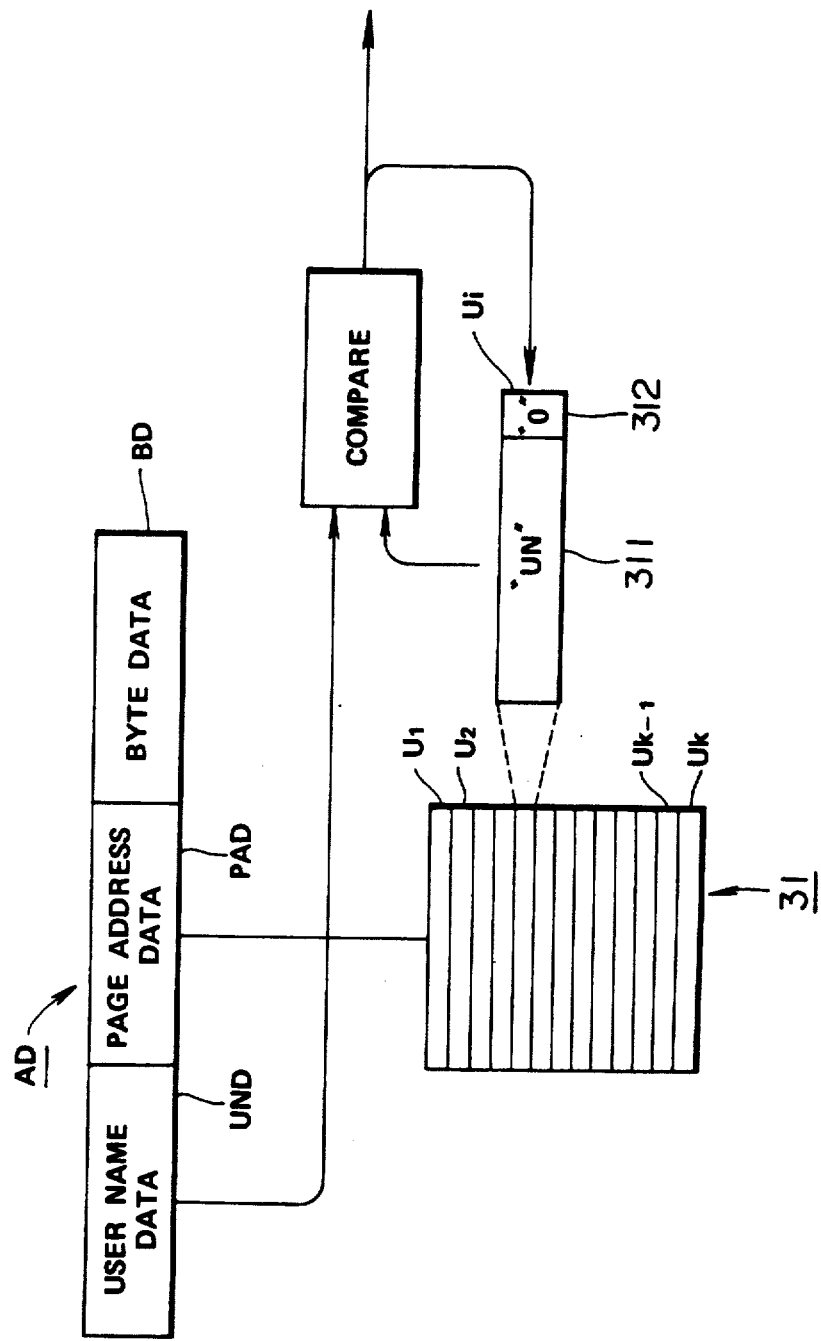
FIG. 17 schematically illustrates the memory structure of a verification table memory and the function of the memory protective device shown in FIG. 16.

If a process manager supplies address data AD, which may include user name data UND, page address data PAD and byte data BD, as shown in FIG. 17, to the corresponding process frame group 20 in order to designate any process frame, a page, corresponding to the address designated by the address data AD, in main memory 21 of that process frame group 20 becomes active, so that the data stored in that page is read and supplied to the corresponding process manager or the data supplied from the corresponding manager is written into that page. At that time, if an unauthorized-access signal FAIL to be described in more detail later has been supplied to that process group (memory), gate 22 is closed to inhibit data reading and writing.

As shown in FIG. 16, memory protective unit 30 includes verification table memory 31, read/write control circuit 32, [0] decoder 33, non-coincidence detection circuit 34, and unauthorized-access signal generator 35. It checks to see if the access designated by address data AD output from the corresponding process manager is made by an authorized user. If that access is an unauthorized one, the protective unit generates an unauthorized-access signal FAIL to inhibit the use of the main memory by that user.

As shown in FIG. 17, verification table memory 31 includes the same number of user descriptors $U_1-U_k$ as the pages of each of main memories 21 of the process frame group 20. Written in the respective user name areas 311 of the user descriptors $U_1-P_k$ are the corresponding user names UN which use the corresponding ones of pages $P_1-P_k$ of each of main memories 21 of process frame group 20. The user names represent the respective identification (ID) numbers $0-(k-1)$ of the process frames $PF_1-PK_k$. When verification table memory 31 has been supplied with page address data PAD contained in the address data AD and is furthermore with a read signal R (see FIG. 16) from read/write control circuit 32, it reads the user name UN written in the user name area 311 of the user descriptor designated by that page address data PAD and supplies the user name to non-coincidence detection circuit 34.

When verification table memory 31 has been supplied with page address data PAD of address data AD and is furthermore with a write signal W (see FIG. 16) from read/write control circuit 32, it writes the name (the identification number of that process frame), represented by the user name data UND supplied from the corresponding process manager, as the user name UN into the user name area 311 of the user descriptor designated by the page address data PAD.

The respective user descriptors $U_1-U_k$ of verification table memory 31 have an additional use inhibiting bit 312 such as shown in FIG. 17. Use inhibiting bit 312 has a logical value "0" written therein indicating that the use of the corresponding process frame group is permitted. Provided that verification table memory 31 is supplied with write signal W when it is already supplied with unauthorized-access signal FAIL, a use-inhibiting bit corresponding to the user descriptor selected at that time is written into a logical value "1" indicating that the use of the corresponding process frame is inhibited.

In the memory protective unit 30 of FIG. 16, when the user name data UND contained in the address data AD is different from the value [0] indicating the $0^{th}$ process frame, i.e., when a user other than the OS (operating system) of the system uses the computer system of this embodiment, [0] decoder 33 detects it and generates a check permission signal (for example, logical "1" signal) CHEN which is then supplied to unauthorized-access signal generator 35.

In the memory protective unit 30, non-coincidence detection circuit 34 includes an internal digital comparator which compares the user name UN, represented by the user name data UND of the address data AD, with the user name UN output by the verification table memory 31 and generates a non-coincidence signal $D_1$ (for example, logical "1" signal) when non-coincidence holds and supplies that signal to unauthorized-access signal generator 35.

Unauthorized-access signal generator 35 includes AND gate 351 such as shown in FIG. 16 and which generates an unauthorized-access signal FAIL (for example, logical "1" signal), provided that it has been supplied with check permission signal CHEN from [0] decoder 33 and is furthermore with non-coincidence signal $D_1$ from non-coincidence detection circuit 34, and supplies that signal FAIL to read/write control circuit 32, gate 22 of the process frame group and the interrupt terminal of the corresponding process manager.

Read/write control circuit 32 supplies read signal R and/or write signal W to verification table memory 31 in accordance with read/write control signal R/W supplied by the corresponding process manager.

The operation of the sixth embodiment will now be described illustratively. First, if address data AD is output by the corresponding process manager, the user name data UND contained in the address data AD is checked by [0] decoder 33.

If the value is other than [0] indicating the $0^{th}$ process frame, [0] decoder 33 determines that this use is made by a user outside the system and outputs check permission signal CHEN to thereby enable unauthorized-access signal generator 35.

In parallel with this operation, read/write control circuit 32 enables verification table memory 31 to be read, and causes the user name UN, written in the user name area 31 of the user descriptor designated by page address data PAD contained in the address data AD among the user descriptors $U_1$-$U_k$, to be read out from verification table memory 31 and to be supplied to non-coincidence detection circuit 34.

If the user name UN output from verification table memory 31 does not coincide with user name UN represented by the user name data UND contained in the address data AD, non-coincidence detection circuit 34 detects that fact and unauthorized-access signal generator 35 generates an unauthorized-access signal FAIL.

By unauthorized-access signal FAIL, the logical value of use inhibiting bit 312 of the user descriptor selected at that time is rewritten to "1" in verification table memory 31 to inhibit the use of the corresponding process frame group by this user, and gate 22 for the process frame group 20 is closed by that unauthorized-access signal FAIL to thereby invalidate the access.

Simultaneously with this, the corresponding process manager is interrupted by the unauthorized-access signal FAIL to stop the access now under execution and the next user is automatically selected by the process switching function that the process manager itself has.

In the above operation, if the user name UN output from verification table memory 31 coincides with the user name UN indicated by the user name data UND contained in the address data AD, the existing access is determined to be made by an authorized user, so that data is read out from, or written into, the corresponding process frame group 20.

According to the sixth embodiment, the respective user programs loaded in the process frame group 20 are arranged so as not to interfere with each other to thereby ensure the respective program operations and to effectively prevent possible destruction of the contents of one user memory by wrong access of another user.

The structure of the memory preventive unit 30 is not restricted to that shown in FIG. 16 and may be any other one which, in summary, has a function of separately receiving address data output from the corresponding process frame, checking to see if the address position and the process frame descriptor (user name) designated by that address position correspond to the actual structure of the appropriate process frame group, and invalidating the access of the process manager using that address data if they do not correspond.

The structure which includes memory protective unit 30 according to the sixth embodiment may be applicable to all the other embodiments described above.

While this invention is contracted as described above, various changes and modifications are possible in actual applications and not restricted to the first to sixth embodiments. The computer systems according to this invention can be constructed by hardware as well as by software which controls the CPU. The latter construction would rather be more efficient.

What is claimed is:

1. A computer system comprising:
   a plurality of network processing elements each including at least three processors and at least one process memory, two of the three processors being designated as channel processors, each channel processor independently controlling communications, and the third processor being designated as a main processor;
   wherein the plurality of network processing elements are connected in a ring formed by channel segments connected only by the channel processors so as to constitute a processing element loop;
   wherein some of the plurality of network processing elements are designated as process managers and each memory associated with each of the process managers constitutes a process frame group which stores a group of processes which are allocated by the process managers so that a particular job is executed; and
   wherein at least one of the network processing elements, other than the network processing elements being designated as the process managers, is designated as a master manager for managing all of the process managers.

2. A computer system according to claim 1, wherein channel processors, other than those used for connection with an adjacent processing element to form the processing element loop, are connected between at least two processing elements to form a corresponding bypass route between those processing elements.

3. A computer system according to claim 1, wherein a matrix switch is interposed among the respective channel processors used for the bypass route to form a bypass route between any processing elements in accorlance with a mode in which the matrix switch is witched.

4. A computer system according to claim 1, wherein t least one of the processing elements which constitute part of the processing element loop, other than the master manager and process managers, is designated as communication manager for communicating with another computer system, the processing element loop being connected with the another computer system via the communication manager.

5. A computer system according to claim 4, wherein a plurality of computer systems are further connected in a ring with the communication manager as a node.

6. A computer system according to claim 5, wherein if a process frame to which a predetermined program can be allocated does not exist in the process frame groups managed by the process managers in one computer system, the master manager of the computer system requests, via the communication manager, another one of the computer systems of the plurality connected in a ring to execute the predetermined program such that all or required ones of the computer systems connected in a ring execute their associated program processing in a dispersive manner.

7. A computer system according to claim 1, further including:
a bus line; and
a plurality of buffer memories, each interposed between the bus line and a respective one of the process frame groups for temporarily storing on a FIFO basis data transmitted between the process frames in the process frame group.

8. A computer system according to claim 1, further including:
a buffer memory interposed in between any adjacent ones of all the processing elements which constitute part of the processing element loop or at a predetermined position among the processing elements, for temporarily storing on a FIFO basis data transmitted between the processing elements.

9. A computer system according to claim 8, wherein the communication between the processing elements is performed by a message communication using a packet as a medium which comprises a desired processed content, transmitter and receiver element descriptors for the processed content, and data; and
the respective processing elements between which the buffer memory is interposed are programamed so as to most preferentially execute a process which refers to the content of packets loaded in the buffer memory.

10. A computer system according to claim 1, further including:
protective means for separately receiving address data generated from a process manager to the corresponding process frame group, checking to see if the address position of the address data and the process frame descriptor designated by the address position correspond to the actual structure of the process frame group, and invalidating the access of the process manager using the address data if no correspondence exists.

11. A computer system according to claim 1, wherein the process frame groups each allocate and register the respective process frames to and in a corresponding plurality of pages;
the address data includes at least data for designating a page for the corresponding process frame group and data for indicating the descriptor of each of the respective process frames; and
the protective means includes a verification table for outputting data indicating a process frame descriptor of the corresponding process frame group on the basis of the data for designating a page in the received address data; means for comparing the data indicating a process frame descriptor output from the verification table with the data indicating the process frame descriptor of the received address data to determine whether both the data coincide; and means for controlling the validation/invalidation of the access by the process manager on the basis of the results of the determination by the determining means.

12. A computer system comprising a first computer unit which includes:
a plurality of network processing elements each including a first communication processor, a second communication processor, a main processor, and a process memory.
wherein the processing elements are connected in a ring configuration such that the ring is formed of channel segments connected only by the first and second communication processors, and wherein the first and second communication processors of each processing element are for independently controlling communication with two adjacent processing elements, and
wherein at least two of the processing elements are process managers which allocate execution of processes to other processing elements, and wherein the process memory of each process manager is sub-divided into a plurality of memory areas called process frames for storing and executing processes under the control of the main processor of the respective process manager.

13. A computer system according to claim 12 wherein at least one of the processing elements is a master manager for managing the process managers.

14. A computer system according to claims 12 or 13 wherein at least one of the processing elements is a server for driving a peripheral device.

15. A computer system according to claims 12 or 13 wherein at least two non-adjacent processing elements further include a third communication processor for independently controlling communication between said processing elements thereby by-passing communication over the ring.

16. A computer system according to claims 12 or 13 wherein each processing element further includes third and fourth communication processors for independently controlling communication between non-adjacent processing elements thereby by-passing communication over the ring, and wherein the computer unit further includes a switch means for selectively linking the third communication processors of non-adjacent processing element pairs and for selectively linking the fourth communication processors of non-adjacent processing element pairs.

17. A computer system according to claim 16 wherein the switch means is a matrix switch.

18. A computer system according to claims 12 or 13, wherein at least one of the processing elements is a communication manager for communicating with at least one computer station.

19. A computer system according to claim 18, wherein the communication manager includes a third communication processor for independently controlling communication with said computer station.

20. A computer system according to claim 19 further including at least one additional computer station, wherein each computer station includes a communication manager for communicating with the first computer unit and the other computer stations, and wherein the first computer unit and the computer stations are connected in a ring with each communication manager as a node.

21. A computer system according to claim 20, wherein the communication manager of the first computer unit includes means for requesting a computer station to execute a process to thereby provide dispersive processing.

22. A computer system according to claim 21 wherein at least one of the computer stations further includes a computer unit comprising:
- a plurality of network processing elements each including a first communication processor, a second communication processor, a main processor, and a process memory,
- wherein the processing elements are connected in a ring configuration via their first and second communication processors, and wherein the first and second communication processors of each processing element are for independently controlling communication with two logically adjacent processing elements, and
- wherein at least two of the processing elements are process managers, and wherein the process memory of each process manager is sub-divided into a plurality of memory areas called process frames for storing and executing processes under the control of the main processor of the respective process manager.

23. A computer system according to claims 12 or 13, further including:
- a bus; and
- a first-in-first-out buffer memory disposed between the bus and at least one process memory for temporarily storing data transmitted between the process frames of that process memory.

24. A computer system according to claims 12 or 13, further including:
- a first-in-first-out buffer memory disposed between two logically adjacent processing elements for temporarily storing data transmitted between the processing elements.

25. A computer system according to claim 24, wherein the buffer memory includes first and second portions for storing data transmitted to and received from an adjacent processing element, respectively.

26. A computer system according to claim 25 wherein the processing elements communicate with each other via message packets including a message to be processed, descriptors identifying the requesting processing element and the requested processing element, and data or pointers thereto.

27. A computer system according to claim 26 wherein the processing elements include means for prioritizing processes so that a process which refers to the content of packets loaded into the buffer memory has priority over other processes.

28. A computer system according to claims 12 or 13 further including security means for denying access to a process frame by a process manager unless such access is authorized.

29. A computer system according to claim 28 wherein the security means includes:
- (a) storage means for storing address data for each process frame; and
- (b) control means for detecting, and denying access to a process frame by a process manager, when the address data received from a process manager does not coincide with the address data for the process frame stored in the storage means.

30. A computer system according to claim 29 wherein:
- (a) the process memory includes a plurality of addressable pages, one for each process frame;
- (b) the process manager includes means for providing a desired page address and an authorization code to the process memory;
- (c) the storage means comprises a table including an authorization code entry for each page in the process memory;
- (d) the control means includes a circuit for detecting and generating a control signal when the authorization code from the process manager is invalid in view of the authorization code in the table corresponding to the desired page address; and
- (e) the control means further includes means responsive to the control signal for denying access to the process frame.

31. A computer system according to claims 12 or 13 wherein the process stored in a process frame of a process manager is part of a user program.

32. A computer system according to claim 31 wherein the process frames of a process manager combine to store a complete user program.

33. A computer system according to claim 32 wherein a main processor and process frames of a process manager cooperate with each other to execute a predetermined job.

* * * * *